United States Patent
Yuasa et al.

(10) Patent No.: US 9,619,228 B2
(45) Date of Patent: Apr. 11, 2017

(54) DATA PROCESSOR WITH A LOAD INSTRUCTION THAT BRANCHES BASED ON A CONTROL REGISTER VALUE AND A BIT OR BITS READ FROM MEMORY

(75) Inventors: Takafumi Yuasa, Musashino (JP); Hiroaki Nakata, Yokohama (JP); Motoki Kimura, Kanagawa (JP); Kazushi Akie, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 1309 days.

(21) Appl. No.: 13/073,992

(22) Filed: Mar. 28, 2011

(65) Prior Publication Data
US 2011/0238964 A1    Sep. 29, 2011

(30) Foreign Application Priority Data

Mar. 29, 2010    (JP) .................................. 2010-075180

(51) Int. Cl.
*G06F 9/30* (2006.01)
*G06F 9/32* (2006.01)

(52) U.S. Cl.
CPC ...... *G06F 9/30101* (2013.01); *G06F 9/30058* (2013.01); *G06F 9/30192* (2013.01); *G06F 9/322* (2013.01)

(58) Field of Classification Search
CPC ......................... G06F 9/30192; G06F 9/30058
USPC ................................................ 712/234, 225
See application file for complete search history.

(56) References Cited

U.S. PATENT DOCUMENTS

| | | | |
|---|---|---|---|
| 4,933,847 A * | 6/1990 | Chau et al. | 712/236 |
| 6,745,320 B1 | 6/2004 | Mitsuishi | |
| 6,791,898 B1 * | 9/2004 | Manapat et al. | 365/233.11 |
| 7,370,243 B1 * | 5/2008 | Grohoski et al. | 714/48 |

(Continued)

FOREIGN PATENT DOCUMENTS

JP    2006-313561 A    11/2006

OTHER PUBLICATIONS

Charles C. Lin, Memory-Mapped I/O, 2003, pp. 1-3 [retrieved on Sep. 11, 2014], Retrieved from the internet <URL:www.cs.umd.edu/class/sum2003/cmsc311/Notes/IO/mapped.html>.*

(Continued)

*Primary Examiner* — Andrew Caldwell
*Assistant Examiner* — Jyoti Mehta
(74) *Attorney, Agent, or Firm* — Shapiro, Gabor and Rosenberger, PLLC

(57) ABSTRACT

The data processor includes CPU operable to execute an instruction included in an instruction set. The instruction set includes a load instruction for reading data on a memory space. The data read according to the load instruction includes data of a format type having a data-read-branching-occurrence bit region. The CPU includes a data-read-branching control register; a data-read-branching address register; and a read-data-analyzing unit. On condition that a bit value showing the occurrence of data read branching has been set on the data-read-branching-occurrence bit region, and a value showing the data-read-branching-occurrence bit remaining valid has been set on the data-read-branching control register, the switching between processes is performed by branching to an address stored in the data-read-branching address register.

9 Claims, 10 Drawing Sheets

(56) References Cited

U.S. PATENT DOCUMENTS

2005/0268075 A1\* 12/2005 Caprioli et al. ............. 712/239
2009/0138679 A1\* 5/2009 Koch, III ..................... 712/205

OTHER PUBLICATIONS

Hennessy and Patterson, Computer Architecture A Quantitative Approach, 1996, Second edition, pp. 74-75.\*

\* cited by examiner

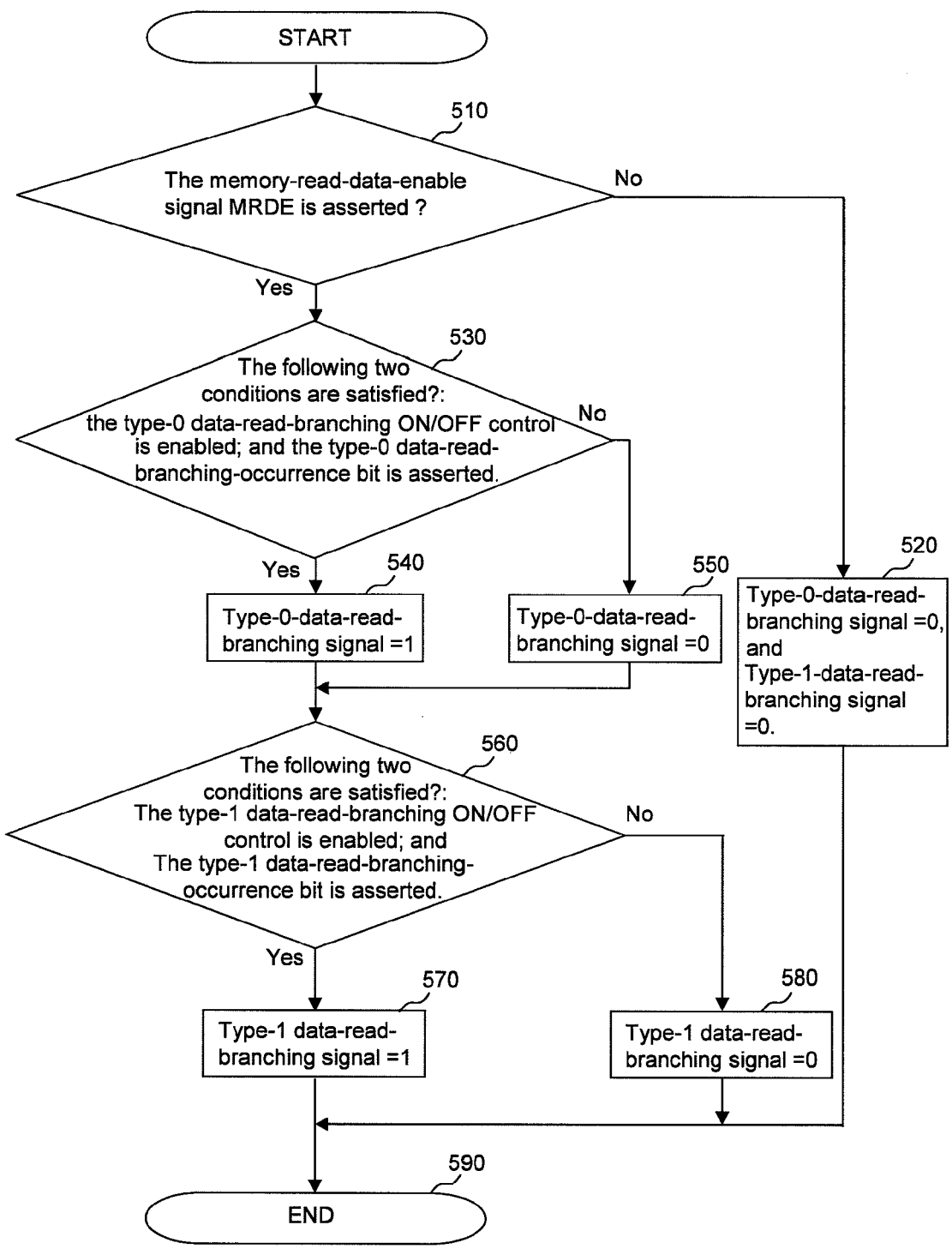

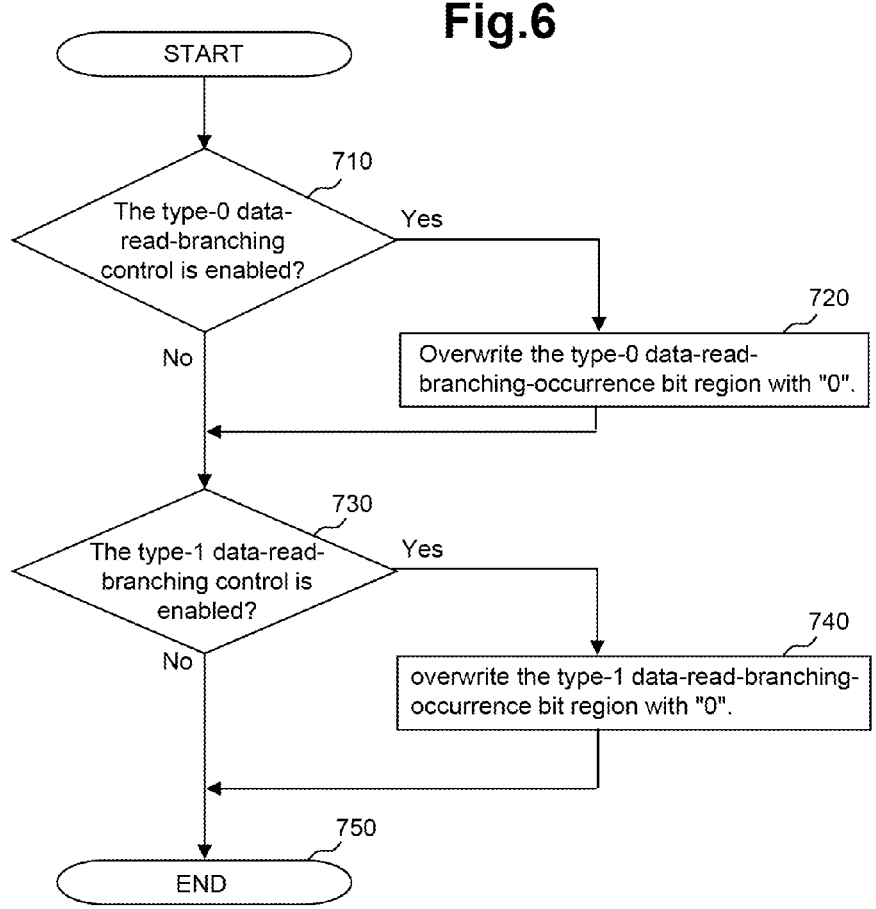
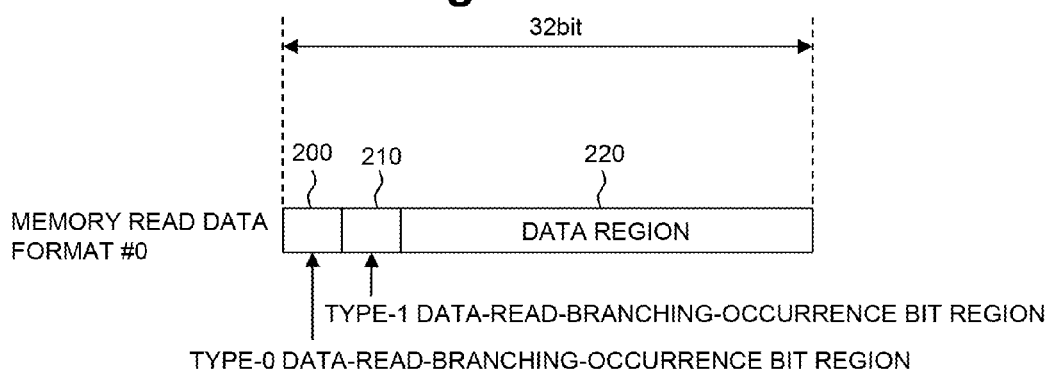
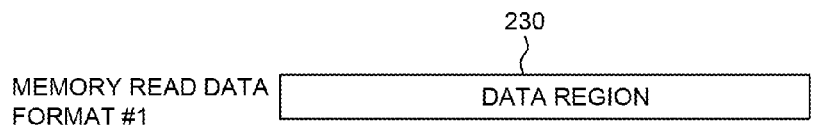

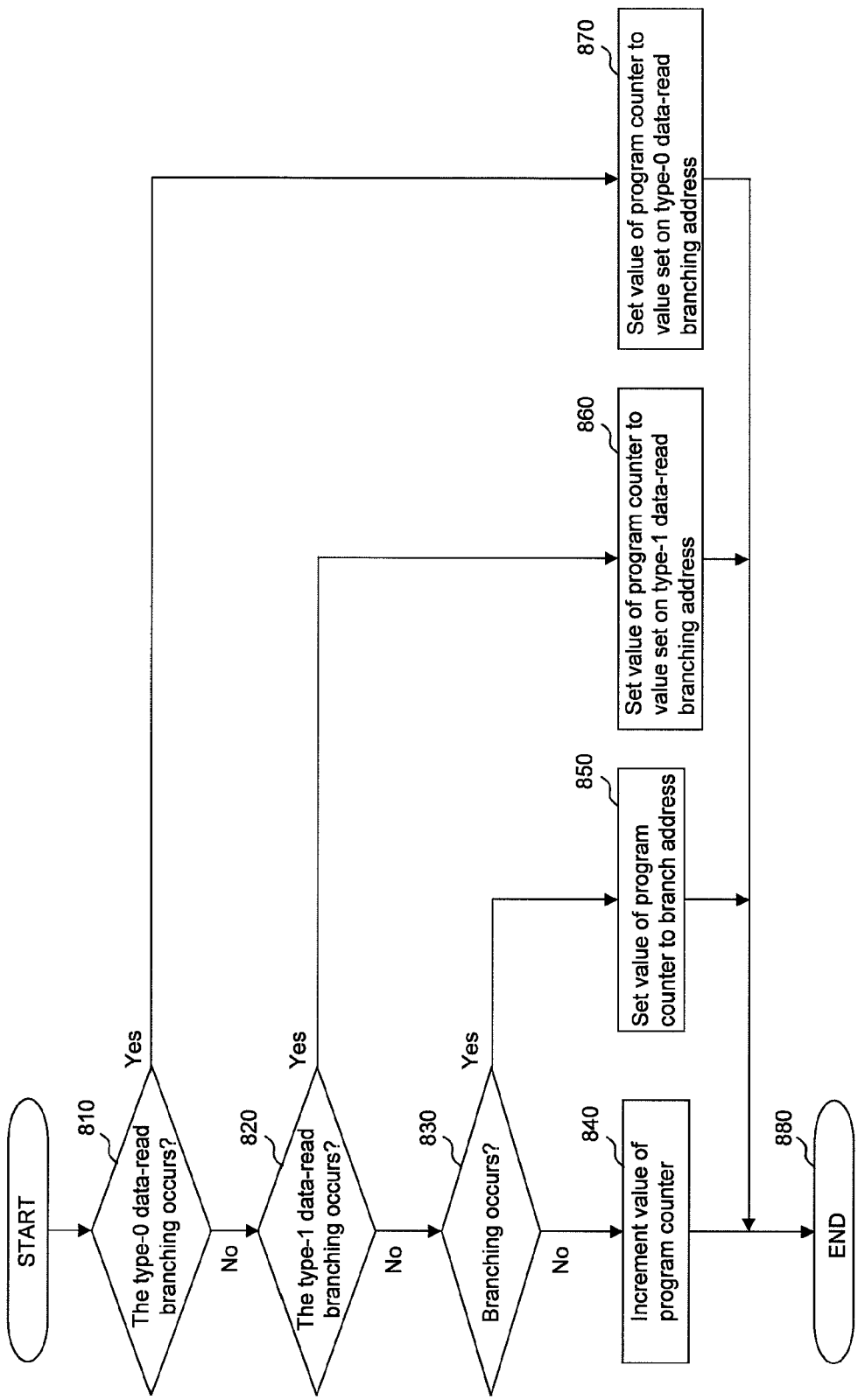

DATA PROCESSOR WITH A LOAD INSTRUCTION THAT BRANCHES BASED ON A CONTROL REGISTER VALUE AND A BIT OR BITS READ FROM MEMORY

CROSS-REFERENCE TO RELATED APPLICATIONS

The Present application claims priority from Japanese application JP 2010-075180 filed on Mar. 29, 2010, the content of which is hereby incorporated by reference into this application.

BACKGROUND

The present invention relates to a data processor including CPU (Central Processing Unit), and to a technique useful in application to e.g. a microprocessor.

In regard to a microprocessor—an example of a data processor, it is sometimes required for software program to execute a process of making reference to a table. In an application, e.g. a process of image coding, reference is made to a table during a variable codeword length coding, etc. In such case, the process of making reference to a table is realized by a procedure which includes mapping a reference table onto a data memory, and making the index and data referred by the index at the table corresponding to the address and the word value of the data memory, respectively. In the process like this, a special processing is sometimes conducted depending on data resulting from the table reference further. In the case of image coding, examples of the special processing are ESCAPE in a RUN/LEVEL decode process in MPEG-2 (ISO/IEC 13818) or the like, and an error processing in response to error detection during a decode process of video streams. For such special processing, the following steps are taken, for example: setting a certain value for comparison to data of the result of table reference or asserting a certain bit field; and checking data of the result of table reference and selectively branching to the special processing according to a conditional branch instruction. Japanese Unexamined Patent Publication No. JP-A-2006-313561 discloses a data processor, such as a microprocessor, which actually performs a process as described above by use of a combination of two or more instructions. Such data processor executes a group of steps of reading data and checking the read data, to the step of branching using a prefix instruction which makes a combining of a data transfer instruction and a bit conditional branch instruction, as if the group of steps is one process executed in response to one instruction.

SUMMARY

After the study concerning the prior art, the inventor found problems as follows.

A series of processes which consists of data read from a memory, a judgment of data of a result of the read, and a branching process, poses a heavy processing load, and can cause the degradation of performance. In the case of using a processor as described in JP-A-2006-313561 to conduct the series of processes, the processor architecture becomes very complicated and the cost of the processor per se would be very high. Further, in the case of using a combination of basic instructions to realize the series of processes, the size of an instruction code becomes larger. In addition, if a branch target for data referred to in a single reference is one of two or more processes, it becomes necessary to execute two or more instructions, which likewise would lead to the degradation of performance.

Therefore, it is an object of the invention to provide a technique which allows subsequent processes to be switched according to a condition of data referred to by executing a predetermined instruction.

The above and other objects of the invention and novel features thereof will be apparent from the description hereof and the accompanying drawings.

Of embodiments of the invention herein disclosed, a representative will be outlined below in brief.

A data processor according to the embodiment includes a CPU operable to execute an instruction which constitutes part of an instruction set. The instruction set includes a load instruction for reading data on a data memory space. Data read according to the load instruction include data of a format type having a data-read-branching-occurrence bit region. The CPU includes: a data-read-branching control register for controlling whether to make the data-read-branching-occurrence bit valid or invalid; at least one data-read-branching address register operable to hold a data read branching address; a read-data-analyzing unit operable to perform an analysis for checking that a bit value showing occurrence of data read branching has been set on the data-read-branching-occurrence bit region, and that a value showing the data-read-branching-occurrence bit remaining valid has been set on the data-read-branching control register; and an instruction fetch unit operable to set, on a program counter, an address value stored in the at least one data-read-branching address register based on a result of the analysis by the read-data-analyzing unit, and to fetch an instruction based on an output value of the program counter.

The effect achieved by the representative embodiment of the invention is as follows in brief.

According to the invention, it is possible to provide a technique which allows subsequent processes to be switched efficiently according to a condition of data referred to by executing a predetermined instruction.

BRIEF DESCRIPTION OF THE DRAWINGS

FIG. 5 is a flow chart showing an example of the process of generating a data-read-branching control signal in the microprocessor;

FIG. 6 is a flow chart showing the flow of the process of generating read data in the microprocessor;

FIG. 7 is a flow chart showing the flow of control of a program counter in the microprocessor;

FIG. 8 is a diagram showing a memory read data format connected with the microprocessor;

FIG. 14 is a diagram showing another memory read data format.

DETAILED DESCRIPTION

1. Summary of the Embodiments

Figure 1:
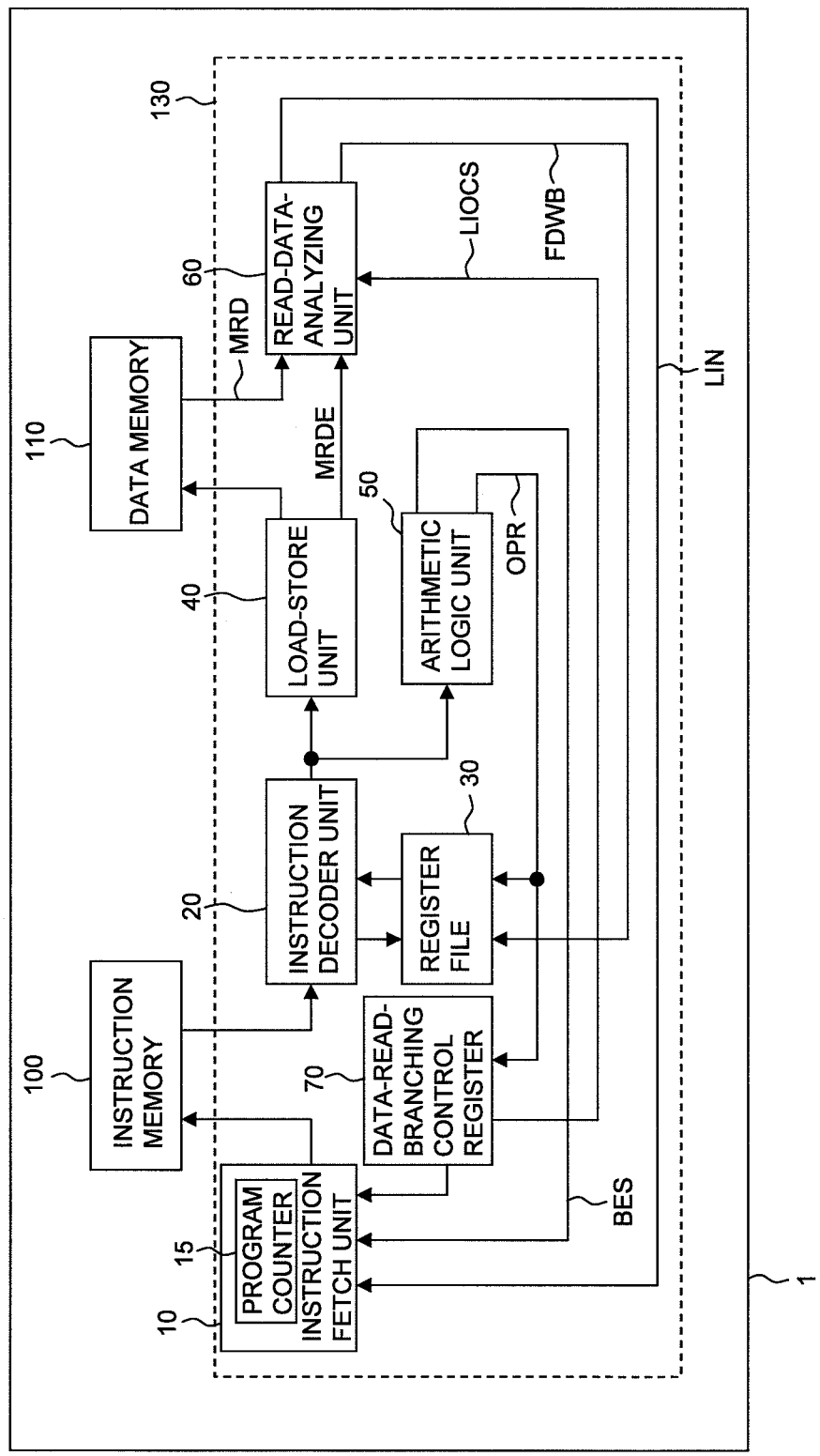
FIG. 1 is a block diagram showing an example of the configuration of a microprocessor, which is an example of the data processor connected with the invention.

The preferred embodiments of the invention herein disclosed will be outlined first. Here, the reference numerals for reference to the drawings, which are accompanied with paired round brackets, only exemplify what the concepts of members or components referred to by the numerals contain.

[1] A data processor (1) according to a preferred embodiment of the invention includes CPU (130) operable to execute an instruction constituting an instruction set. The instruction set includes a load instruction for reading data on a data memory space managed by the CPU. Data read according to the load instruction include data of a format type having a data-read-branching-occurrence bit region. The CPU includes: a data-read-branching control register (300, 310) for controlling whether to make the data-read-branching-occurrence bit valid or invalid; and at least one data-read-branching address register (320, 330) operable to hold a data read branching address. Also, the CPU includes a read-data-analyzing unit (60) operable to perform an analysis for checking that a bit value showing the occurrence of data read branching has been set on the data-read-branching-occurrence bit region, and that a value showing the data-read-branching-occurrence bit remaining valid has been set on the data-read-branching control register. Further, the CPU includes an instruction fetch unit (10) operable to set, on a program counter (15), an address value stored in the at least one data-read-branching address register based on a result of the analysis by the read-data-analyzing unit, and to fetch an instruction based on an output value of the program counter. According to the above arrangement, when it is found as a result of the analysis by the read-data-analyzing unit that the following two conditions are both satisfied, a branching to an address value stored in the data-read-branching address register occurs. The first is that a bit value showing the occurrence of data read branching has been set on the data-read-branching-occurrence bit region. The second is that a value showing the data-read-branching-occurrence bit remaining valid has been set on the data-read-branching control register. In this way, subsequent processes can be switched efficiently according to a condition of data referred to by executing a load instruction. Especially, as long as values to set on the data-read-branching control register, and the data-read-branching address register have been described in a program running on the CPU, the values can be set on the resisters by executing a transfer-to-register instruction or the like. Therefore, a data read branching address and the like can be changed readily.

[2] With the data processor as described in [1], the device disposed in the memory space may include a data memory.

[3] With the data processor as described in [2], the device disposed in the memory space may further include an I/O device disposed in the memory space by a memory mapped I/O method.

[4] With the data processor as described in [1], the data-read-branching-occurrence bit region may consist of N bits, the data-read-branching control register may consist of N bits, and a number of the at least one data-read-branching address register may be N, provided that N is an integer of two or more.

According to the above arrangement, even in the case that the branching to two or more processes can occur for data referred to in a single reference, it is possible to deal with the branching by executing a load instruction.

[5] The data processor as described in [2] may be arranged so that the instruction set includes first and second load instructions, and data read according to the first load instruction includes data of a format type having a data-read-branching-occurrence bit region, and data read according to the second load instruction includes data of a format type such that all of bits of the data are made a data region.

According to this arrangement, the first and second load instructions can be use selectively on an as-needed basis. An example of such selective use is to use a load instruction adapted to the data format such that all the bits are treated as one data region when data read branching is not required.

[6] A data processor (1) according to another preferred embodiment of the invention includes: a CPU (130) operable to execute an instruction included in an instruction set; and an I/O device (120) disposed in an I/O space managed by the CPU. The instruction set includes an I/O read instruction for reading data from the I/O device, and the data read according to the I/O read instruction includes data of a format type having a data-read-branching-occurrence bit region to store a data-read-branching-occurrence bit in. The CPU includes: a data-read-branching control register (300, 310) for controlling whether to make the data-read-branching-occurrence bit valid or invalid; and at least one data-read-branching address register (320, 330) operable to hold a data read branching address. Further, the CPU includes a read-data-analyzing unit (60) operable to perform an analysis for checking that a bit value showing occurrence of data read branching has been set on the data-read-branching-occurrence bit region, and that a value showing the data-read-branching-occurrence bit remaining valid has been set on the data-read-branching control register. Also, the CPU includes an instruction fetch unit (10) operable to set, on a program counter (15), an address value stored in the at least one data-read-branching address register based on a result of the analysis by the read-data-analyzing unit, and to fetch an instruction based on an output value of the program counter.

According to the above arrangement, when it is found as a result of the analysis by the read-data-analyzing unit that the following two conditions are both satisfied, a branching to an address value stored in the data-read-branching address register occurs as in the case of the data processor described in [1]. The first is that a bit value showing the occurrence of data read branching has been set on the data-read-branching-occurrence bit region. The second is that a value showing the data-read-branching-occurrence bit remaining valid has been set on the data-read-branching control register. In this way, subsequent processes can be switched efficiently according to a condition of data referred to by executing an I/O read instruction. Especially, as long as values to set on the data-read-branching control register, and the data-read-branching address register have been described in a program running on the CPU, the values can be set on the resisters by executing a transfer-to-register instruction or the like. Therefore, a data read branching address and the like can be changed readily.

[7] With the data processor as described in [6], the data-read-branching-occurrence bit region may consist of N bits, the data-read-branching control register may consist of N bits, and a number of the at least one data-read-branching address register may be N, provided that N is an integer more than one.

According to the above arrangement, as in the case of the data processor as described in [4], even in the case that the branching to two or more processes can occur for data referred to in a single reference, it is possible to deal with the branching by executing a load instruction.

[8] The data processor as described in [7] may be arranged so that the instruction set includes first and second I/O read instructions, data read according to the first I/O read instruction includes data of a format type having a data-read-branching-occurrence bit region, and data read according to the second I/O read instruction includes data of a format type such that all of bits of the data are made a data region. In this case, it is possible to select a memory read data format type according to an application thereof.

[9] A data processor (1) according to another preferred embodiment of the invention includes: a CPU (130) operable to execute an instruction included in an instruction set; a data memory (110) disposed in a memory space managed by the CPU; and an I/O device (120) disposed in an I/O space managed by the CPU. The instruction set includes a first instruction for reading data from the data memory, and a second instruction for reading data from the I/O device. Data read according to one of the first and second instructions includes data of a format type having a data-read-branching-occurrence bit region to store a data-read-branching-occurrence bit in. The CPU includes: a data-read-branching control register (300, 310) for controlling whether to make the data-read-branching-occurrence bit valid or invalid; and at least one data-read-branching address register (320, 330) operable to hold a data read branching address. The CPU further includes a read-data-analyzing unit operable to perform an analysis for checking that a bit value showing occurrence of data read branching has been set on the data-read-branching-occurrence bit region, and that a value showing the data-read-branching-occurrence bit remaining valid has been set on the data-read-branching control register. In addition, the CPU includes an instruction fetch unit (10) operable to set, on a program counter (15), an address value stored in the at least one data-read-branching address register based on a result of the analysis by the read-data-analyzing unit, and to fetch an instruction based on an output value of the program counter.

2. Further Detailed Description of the Embodiments

The embodiments will be described further in detail.

First Embodiment

FIG. 1 shows an example of the configuration of a microprocessor, which is an example of the data processor connected with the invention. Although no special restriction is intended, the microprocessor 1 is formed on a semiconductor substrate, such as a substrate of monocrystalline silicon, by a known semiconductor ICs' manufacturing technique.

Without any specific limitation, the microprocessor 1 shown in FIG. 1 includes an instruction memory 100, a data memory 110, and a CPU (Central Processing Unit) 130. The CPU 130 includes: an instruction fetch unit 10 with a program counter 15; an instruction decoder unit 20; a register file 30; a load-store unit 40; an arithmetic logic unit 50; a read-data-analyzing unit 60; and a data-read-branching control register 70.

The instruction memory 100 and the data memory 110 are devices connected with CPU 130. The CPU 130 can access the instruction memory 100 and the data memory 110 on condition that the instruction memory 100 and the data memory 110 are placed in an address space managed by CPU 130. Of address spaces managed by CPU 130, a space where a memory is placed is referred to as "memory space". Examples of the instruction used for an access to the data memory 110 include a load instruction and a store instruction. The load instruction is an instruction for putting, in a register, a memory content indicated by an address. The store instruction is an instruction for writing, in the memory, data in the register.

The instruction fetch unit 10 fetches data (instruction) at an address corresponding to a value of the program counter 15 from the instruction memory 100. The instruction decoder unit 20 decodes an instruction read from the instruction memory 100, and outputs the result of the decode to the load-store unit 40 and the arithmetic logic unit 50.

Although no special restriction is intended, in this embodiment, the load-store unit 40 is activated in the case where an instruction subjected to the decode is a load or store instruction. However, in the case where an instruction other than load and store instructions goes through the decode, the arithmetic logic unit 50 is activated.

In the case where the instruction decoded by the instruction decoder unit 20 is a store instruction, the load-store unit 40 writes a value of data input from the instruction decoder unit 20 in the data memory 110 at an address indicated by an address value conveyed from the instruction decoder unit 20.

In the case where the instruction decoded by the instruction decoder unit 20 is a load instruction, the load-store unit 40 makes a read access to an address of the data memory 110 indicated by an address value conveyed from the instruction decoder unit 20. In addition, the load-store unit 40 outputs a memory-read-data-enable signal MRDE to the read-data-analyzing unit 60.

The read-data-analyzing unit 60 analyzes data read from the data memory 110 based on a data-read-branching ON/OFF control signal LIOCS output by the data-read-branching control register 70, and then supplies a write-back signal FDWB to the register file 30 and a data-read-branching signal LIN to the instruction fetch unit 10. The read-data-analyzing unit 60 is to be described later in detail.

In the case where the instruction decoded by the instruction decoder unit 20 is a transfer-to-register instruction, an arithmetic-operation instruction, or a logic-operation instruction, the arithmetic logic unit 50 performs an arithmetic and logic operation on source data input from the instruction decoder unit 20 according to a result of decode of the instruction, and then writes a result OPR of the arithmetic and logic operation in the register file 30 or the data-read-branching control register 70. Which of the register file 30 and the data-read-branching control register 70 to write the result of the operation in is defined by an instruction operand. The data-read-branching control register 70 is to be described later in detail.

In the case where the instruction decoded by the instruction decoder unit 20 is a typical branch instruction, the arithmetic logic unit 50 sets, as a branch-destination address, an address value which is input from the instruction decoder unit 20, and asserts the branch-destination address and a branch-enable signal BES to the instruction fetch unit 10. In the case where the instruction decoded by the instruction decoder unit 20 is a conditional branch instruction, the arithmetic logic unit 50 decides whether or not to assert the branch-enable signal BES according to a value of source data input from the instruction decoder unit 20, and a condition designated by an instruction opcode. For example, in the case where the processor 1 supports a conditional branch instruction of brt (branch if true), and the result of the decode is the brt instruction, the arithmetic logic unit 50 makes a judgment on whether or not the value of source data is a non-zero value. As a result, if the value of source data is judged to be a non-zero value, the arithmetic logic unit 50 asserts the branch-enable signal BES. If the value of source data is judged to be a value of zero, the arithmetic logic unit 50 negates the branch-enable signal BES.

The instruction fetch unit 10 controls the program counter 15 according to whether or not a branch occurs from the arithmetic logic unit 50, and whether or not a data-read branch occurs from the read-data-analyzing unit 60, and decides the address of an instruction to fetch from the instruction memory 100 next. The action of instruction fetch unit 10 is to be described later in detail.

Next, the format of data read from the memory will be described with reference to FIG. 2.

In this embodiment, the word width of the data memory 110 is 32 bits. However, what described here can be applied to different word widths, e.g. 16 bits and 64 bits. The memory read data format #0 shown in FIG. 2 defines the most significant bit (i.e. $31^{th}$ bit) of 32-bit data as a type-0 data-read-branching-occurrence bit region 200, the second bit from the most significant bit (i.e. $30^{th}$ bit) as a type-1 data-read-branching-occurrence bit region 210, and the remaining bits, i.e. $29^{th}$ to $30^{th}$ bits as a data region 220.

Figure 3:
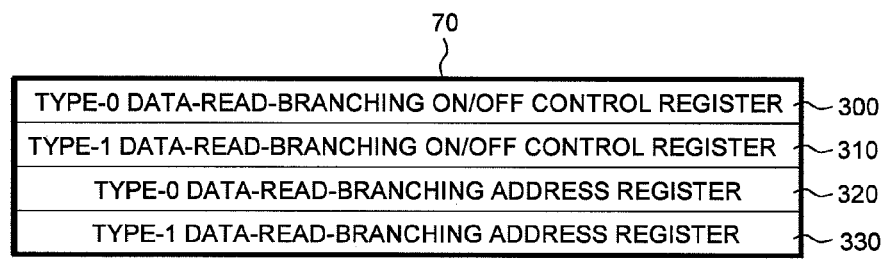
FIG. 3 is a diagram for explaining an example of the configuration of a data-read-branching control register of the microprocessor.

Next, the configuration of the data-read-branching control register 70 will be described with reference to FIG. 3.

The data-read-branching control register 70 is provided to control the branching based on data read out from the data memory 110 using a load instruction, which is referred to as "data read branching", rather than the branching based on the branch-enable signal BES. Although no special restriction is intended, the data-read-branching control register 70 includes: a type-0 data-read-branching ON/OFF control register 300; a type-1 data-read-branching ON/OFF control register 310; a type-0 data-read-branching address register 320; and a type-1 data-read-branching address register 330. The type-0 data-read-branching ON/OFF control register 300, and the type-1 data-read-branching ON/OFF control register 310 are registers, on which logical values of "1" and "0" can be set respectively, and which are used for controlling the occurrence of type-0 data read branching and the occurrence of type-1 data read branching respectively. The type-0 data-read-branching address register 320, and the type-1 data-read-branching address register 330 are registers, on which appropriate instruction memory address values can be set respectively, and which are used for setting an branch-destination address at the occurrence of the type-0 data read branching and the type-1 data read branching. Setting values on these registers can be made by a transfer-to-register instruction or the like. In other words, the values to set on the registers in the data-read-branching control register 70 have been described in a software program—stored in the instruction memory 100—executed by CPU 130, and these values are set on the resisters in the data-read-branching control register 70 by executing a transfer-to-register instruction or the like.

Figure 4:
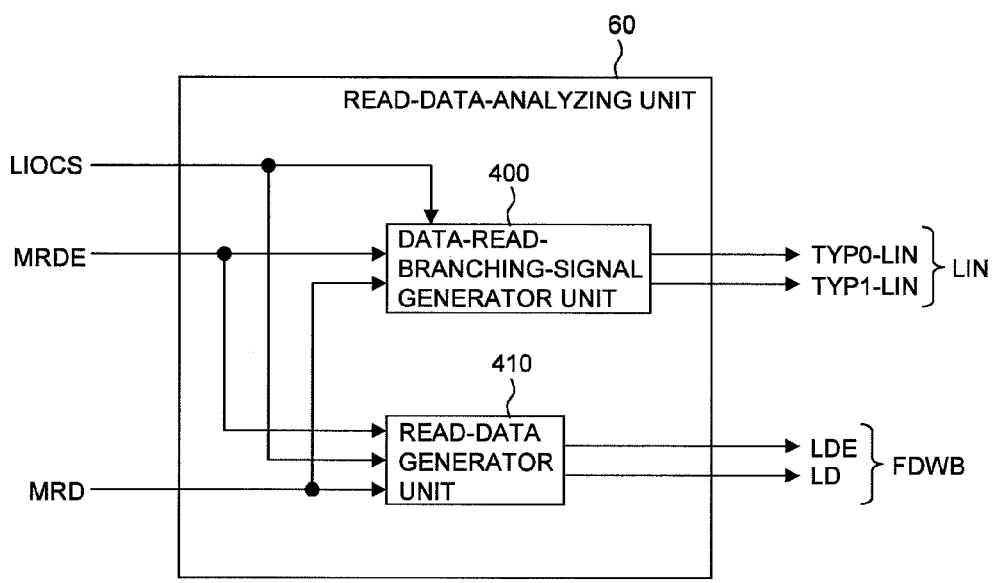
FIG. 4 is a block diagram showing an example of the configuration of a read-data-analyzing unit of the microprocessor.

FIG. 4 shows an example of the configuration of the read-data-analyzing unit 60.

The read-data-analyzing unit 60 includes a data-read-branching-signal generator unit 400, and a read-data generator unit 410. The data-read-branching-signal generator unit 400 accepts the input of a data-read-branching ON/OFF control signal LIOCS from the data-read-branching control register 70, a memory-read-data-enable signal MRDE from the load-store unit 40, and memory read data MRD from the data memory 110 and generates, from these signals, a type-0 data-read-branching signal TYP0-LIN and a type-1 data-read-branching signal TYP1-LIN. The resultant type-0 data-read-branching signal TYP0-LIN and type-1 data-read-branching signal TYP1-LIN are output to the instruction fetch unit 10. Now, it is noted that the memory-read-data-enable signal MRDE, and the memory read data MRD are included in the write-back signal FDWB which has been described with reference to FIG. 1, and the type-0 data-read-branching signal TYP0-LIN and the type-1 data-read-branching signal TYP1-LIN are included in the data-read-branching signal LIN which has been described with reference to FIG. 1. The process by the data-read-branching-signal generator unit 400 is to be described later in detail. The read-data generator unit 410 accepts the input of a data-read-branching ON/OFF control signal from the data-read-branching control register 70, a memory-read-data-enable signal MRDE from the load-store unit 40, and a memory read data MRD from the data memory 110 and generates, from these signals, a load-data enable signal LDE and a load data LD. The process by the read-data generator unit 410 is to be described later in detail.

Now, the actions in the units of the microprocessor in the case where a load instruction involving a data read branching is fetched will be described.

A load instruction involving a data read branching is restricted by a value of data read from the data memory 110 according to the load instruction, and a set value on the data-read-branching control register 70 in action.

FIG. 5 shows the flow of the process of generating a data-read-branching signal in the read-data-analyzing unit 60 at the time of execution of a load instruction.

After execution of a load instruction, the load-store unit 40 first asserts the memory-read-data-enable signal MRDE in synchronization with the input of read data from the data memory 110 to the read-data-analyzing unit 60. The timing of the assertion is uniquely determined depending on a pipeline of the processor and another factor, and the latency of the data memory 110. If the memory-read-data-enable signal MRDE has not been asserted ("No" in Step 510), i.e. if input data from the data memory 110 is invalid, the read-data-analyzing unit 60 negates the type-0 data-read-branching signal, and the type-1 data-read-branching signal to the logical value "0" (Step 520), and then the generation of the data-read-branching signal is terminated (Step 590). In contrast, if the memory-read-data-enable signal MRDE has been asserted ("Yes" in Step 510), i.e. if a load instruction is executed and input data from the data memory 110 is valid, the read-data-analyzing unit 60 makes a judgment on whether or not the type-0 data read branching occurs (Step 530). If the type-0 data-read-branching ON/OFF control register 300 has a non-zero value, and the type-0 data-read-branching-occurrence bit region 200 of read data from the data memory 110 holds the logical value "1" ("Yes" in Step 530), the type-0 data-read-branching signal is asserted (Step 540). If the type-0 data-read-branching ON/OFF control register 300 has the value "0" or the type-0 data-read-branching-occurrence bit region 200 of read data from the data memory 110 has the logical value "0" ("No" in Step 530), the type-0 data-read-branching signal is negated (Step 550). After the process of the type-0 data-read branch generation, whether or not the type-1 data read branching occurs is judged (Step 560). If the type-1 data-read-branching ON/OFF control register 310 has a non-zero value, and the type-1 data-read-branching-occurrence bit region 210 of read data from the data memory 110 has the logical value "1" ("Yes" in Step 560, the type-1 data-read-branching signal is asserted (Step 570). If the type-1 data-read-branching ON/OFF control register 310 has the value "0", or the type-1 data-read-branching-occurrence bit region 210 of read data from the data memory 110 has the logical value "0" ("No" in Step 560), the type-1 data-read-branching signal is negated (Step 580). After the process of the type-1 data read branch generation, the process for generation of the data-read-branching signal is terminated (Step 590).

FIG. 6 shows the flow of the process of generating read data in the read-data-analyzing unit 60 at the time of execution of a load instruction.

The read-data generator unit 410 makes a judgment about the value of the type-0 data-read-branching ON/OFF control register 300, which is input from the data-read-branching control register 70 (Step 710). As a result of the judgment, if the type-0 data-read-branching ON/OFF control register 300 is judged to be a non-zero value, the bit value of the type-0 data-read-branching-occurrence bit region 200 of the memory read data MRD is overwritten with the logical value "0" (Step 720). In contrast, if the type-0 data-read-branching ON/OFF control register 300 is judged to be the value "0", no operation is performed on the memory read data MRD. Subsequently, the read-data generator unit 410 makes a judgment about the value of the type-1 data-read-branching ON/OFF control register 310, which is input from the data-read-branching control register (Step 730). As a result of the judgment, if the type-1 data-read-branching ON/OFF control register 310 is judged to be a non-zero value, the bit value of the type-0 data-read-branching-occurrence bit region 200 of the memory read data MRD is overwritten with the logical value "0" (Step 740). In contrast, if the type-1 data-read-branching ON/OFF control register 310 is judged to be the value "0", no operation is performed on the memory read data MRD. Then, the process of generating read data is terminated (Step 750). A data value obtained following the procedure as described above is output as a final load data value to write in the register file 30.

FIG. 7 shows the flow of control of the program counter 15 in the instruction fetch unit 10.

In each cycle, in which the program counter 15 must be updated, the following steps are performed. First, the instruction fetch unit 10 makes a judgment about whether or not a type-0 data read branching occurs (Step 810). If the type-0 data-read-branching signal, which is input from the read-data-analyzing unit 60, has been asserted ("Yes" in Step 810), the instruction fetch unit 10 updates the value of the program counter 15 to a value set on the type-0 data-read-branching address register 320 (Step 870), and then the update of the program counter 15 is terminated (Step 880). If the type-0 data-read-branching signal has not been asserted ("No" in Step 810), the instruction fetch unit 10 makes a judgment about whether or not the type-1 data-read branching occurs (Step 820). If the type-1 data-read-branching signal input from the read-data-analyzing unit 60 has been asserted ("Yes" in Step 820), the instruction fetch unit 10 updates the value of the program counter 15 to a value set on the type-0 data-read-branching address register 320 (Step 860), and then the update of the program counter 15 is terminated (Step 880). If the type-1 data-read-branching signal has not been asserted ("No" in Step 820), the instruction fetch unit 10 makes a judgment about whether or not the branching occurs in the program (Step 830). If the branch-enable signal BES input from the arithmetic logic unit 50 has been asserted ("Yes" in Step 830), the instruction fetch unit 10 updates the value of the program counter 15 to a branch address value input from the arithmetic logic unit 50 (Step 850), and then the update of the program counter 15 is terminated (Step 880). If the branch-enable signal BES has not been asserted ("No" in Step 830), the instruction fetch unit 10 increments the value of the program counter 15 (Step 840), and then the update of the program counter 15 is terminated (Step 880).

An address value stored in the data-read-branching address register 320/330 is set on the program counter 15 on condition that a bit value showing the occurrence of data read branching has been set on the data-read-branching-occurrence bit region 200/210, and a value showing that the data-read-branching-occurrence bit remains valid has been set on the data-read-branching ON/OFF control register 300/310, as described above. Therefore, the switching of processes after that can be performed efficiently according to the condition of data referred to in execution of a load instruction.

The branching of the flow of program execution is caused based on the result of analysis by the read-data-analyzing unit 60 following the flow of steps described above, and therefore a process such that the result of execution of a load instruction is referred to, and then a program branching occurs selectively based on the result can be realized readily.

Second Embodiment

Figure 2:
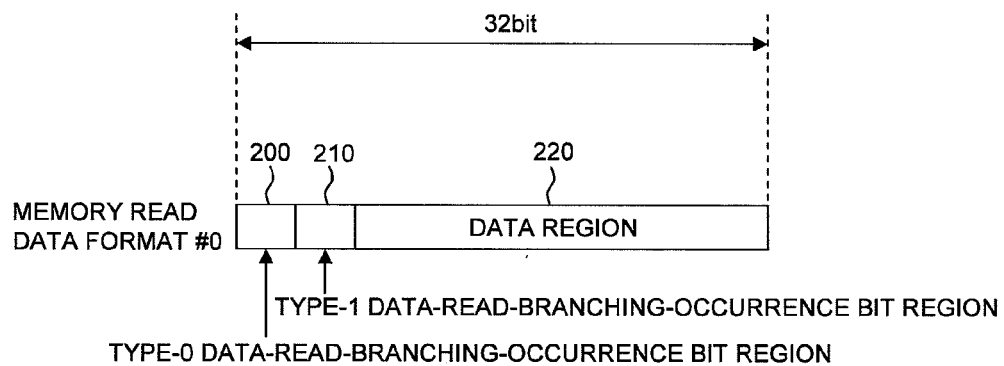
FIG. 2 is a diagram showing a memory read data format connected with the microprocessor.

While in the first embodiment one memory read data format as shown in FIG. 2 is assumed, two or more memory read data formats may be adopted.

FIGS. 8 and 14 show an example in which two memory read data formats are adopted.

Figure 9:
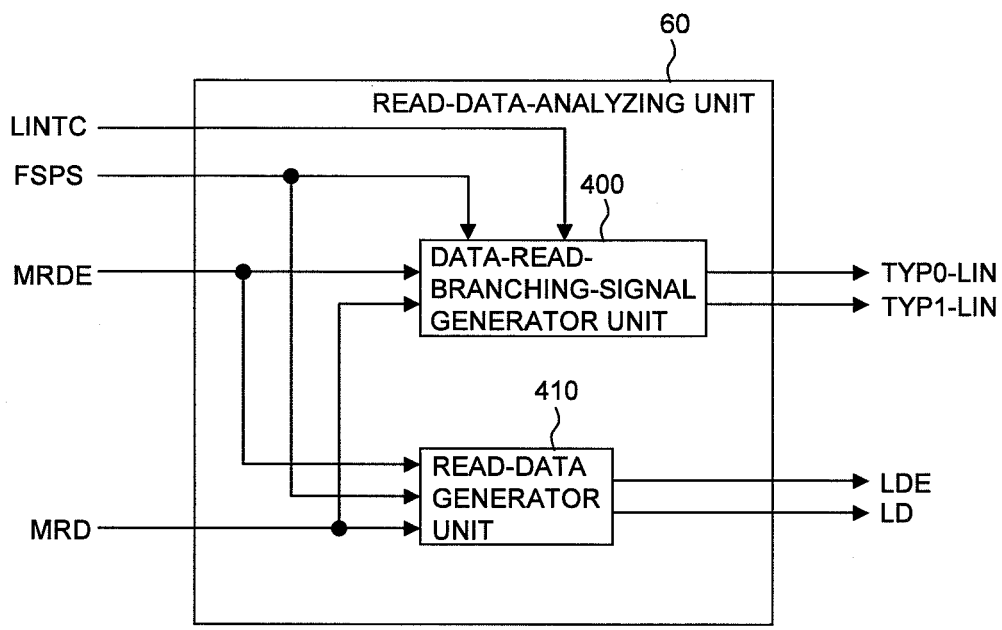
FIG. 9 is a block diagram showing an example of the configuration of the read-data-analyzing unit in the microprocessor.

FIG. 8 shows Format #0 as one of the memory read data formats, and FIG. 14 shows Format #1 by which all the bits are treated as one data region 230. In this case, a format-designating signal FSPS is input to the read-data-analyzing unit 60 from the load-store unit 40 as shown in FIG. 9. In the read-data-analyzing unit 60, Format #0 or Format #1 are designated by the format-designating signal FSPS. The format-designating signal FSPS uses e.g. an instruction operand to make the designation. In this case, two load instructions are prepared for an instruction set. The Format #0 shown in FIG. 8 is used for the first load instruction, and the Format #1 shown in FIG. 14 is used for the second load instruction.

Figure 10:
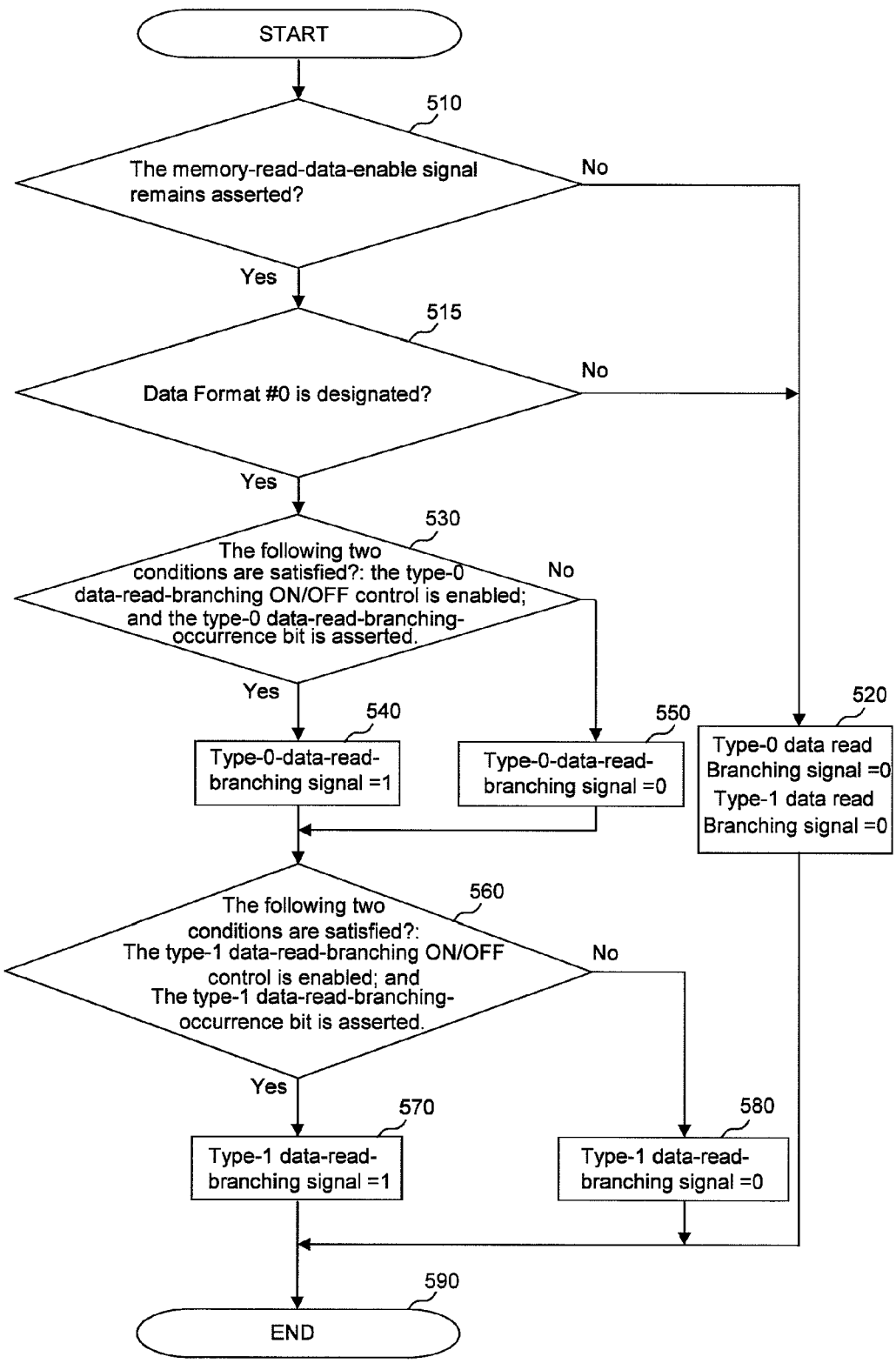
FIG. 10 is a flow chart showing the flow of the process of generating a data-read-branching control signal in the microprocessor.

FIG. 10 shows the flow of the process of generating the data-read-branching control signal LICS in the case of additionally using the format-designating signal FSPS.

If the memory-read-data-enable signal MRDE has not been asserted ("No" in Step 510), namely if input data from the data memory 110 is invalid, the read-data-analyzing unit 60 negates both of the type-0 data-read-branching signal, and the type-1 data-read-branching signal (Step 520), and then the process (Step 590) is terminated. When the memory-read-data-enable signal MRDE is asserted (Step 510), the read-data-analyzing unit 60 analyzes the format-designating signal FSPS (Step 515). If the format of type #1 is designated ("No" in Step 515), the read-data-analyzing unit 60 negates both of the type-0 data-read-branching signal and the type-1 data-read-branching signal (Step 520), and then the process is terminated (Step 590). If the format of type #0 is designated ("Yes" in Step 515), the read-data-analyzing unit 60 goes into the step of judging whether or not the type-0 data read branching occurs (Step 530). The steps subsequent to Step 530 are the same as the steps after Step 530 shown in FIG. 5.

Figure 11:
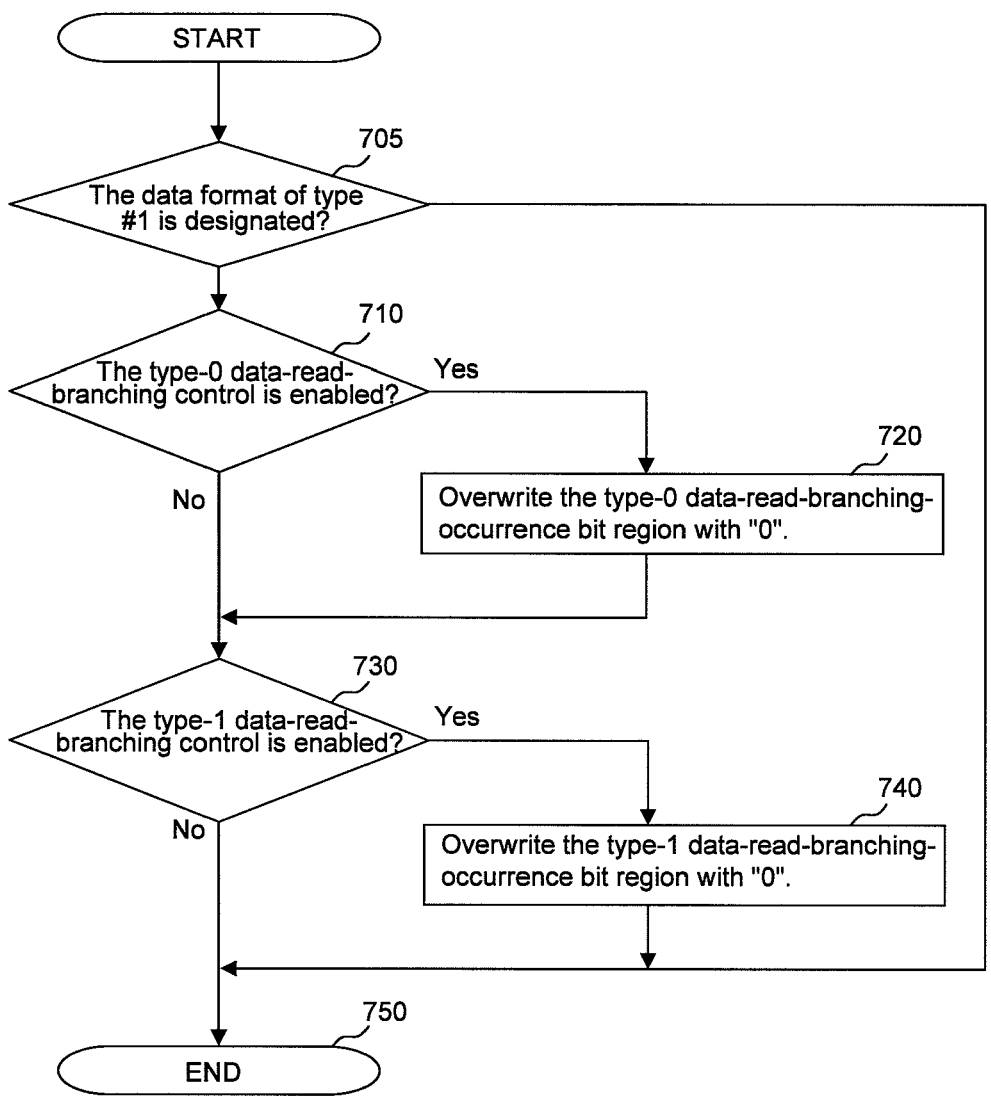
FIG. 11 is a flow chart showing the flow of the process of read data in the microprocessor.

FIG. 11 shows the flow of generation of read data in the case of additionally using the format-designating signal FSPS.

The read-data generator unit 410 analyzes the format-designating signal FSPS (Step 705). If the format of type #1 is designated ("No" in Step 705), the read-data generator unit 410 outputs read data from the memory as it is, and then the process is terminated (Step 750). If the format of type #0 is designated ("Yes" in Step 705), the read-data generator unit 410 goes into the step of making a judgment on a value of the type-0 data-read-branching ON/OFF control register 300 input from the data-read-branching control register 70 (Step 710). The steps subsequent to Step 710 are the same as the steps after Step 710 shown in FIG. 6.

As long as the memory read data formats #0 and #1 are prepared corresponding to the first and second load instructions as described above, the first and second load instructions can be used selectively on an as-needed basis. An example of such selective use is to use a load instruction adapted to the data format such that all the bits are treated as one data region 230 as shown in FIG. 14 when data read branching is not required.

Third Embodiment

Figure 12:
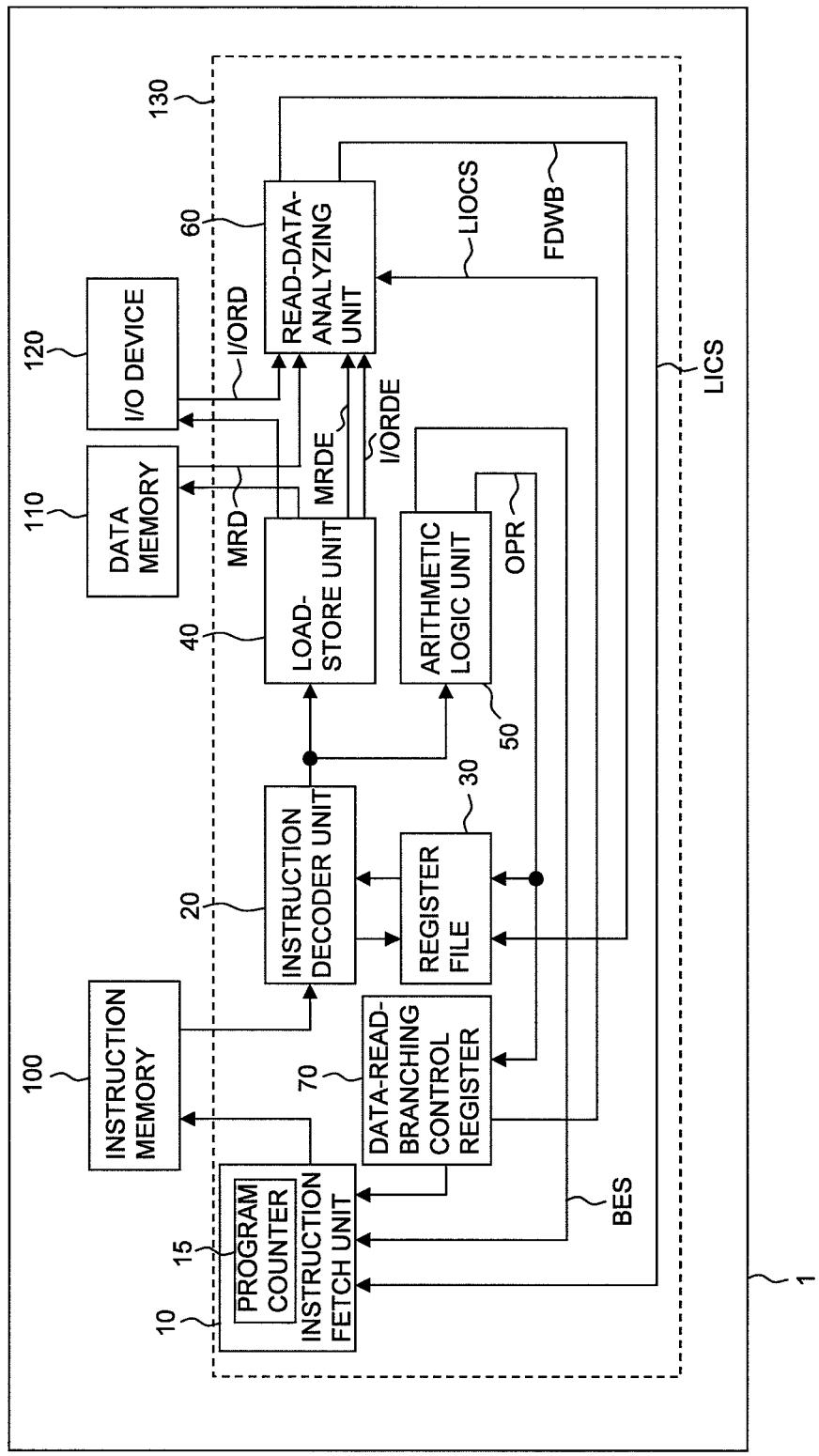
FIG. 12 is a block diagram showing another example of the configuration of the microprocessor.

FIG. 12 shows an example of the configuration of the microprocessor 1.

The microprocessor 1 shown in FIG. 12 widely differs from the microprocessor shown in FIG. 1 in that an I/O device 120 which can exchange various kinds of signals with the outside is provided separately from the data memory 110.

In the case of the memory mapped I/O method, the data memory 110 and the I/O device 120 are disposed in a memory space, which CPU 130 manages, and an access to the I/O device 120 can be made by using a load instruction. Although no special restriction is intended, the I/O device 120 serves as an I/O port which makes possible to exchange various kinds of signals with a device located outside the microprocessor 1.

In addition, it is possible to practice a procedure which includes: forming a memory space and an I/O space in an address space managed by CPU 130 separately; and arranging the data memory 110 in the memory space, and the I/O device 120 in the I/O space. In this case, it is possible to use a load instruction for data read from the data memory 110, and an I/O read instruction for data read from the I/O device 120. When the instruction decoder unit 20 decodes an I/O read instruction, the load-store unit 40 reads data from the I/O device 120 in response to that. In parallel with this, the read-data-analyzing unit 60 analyzes the data read from the I/O device 120.

Figure 13:
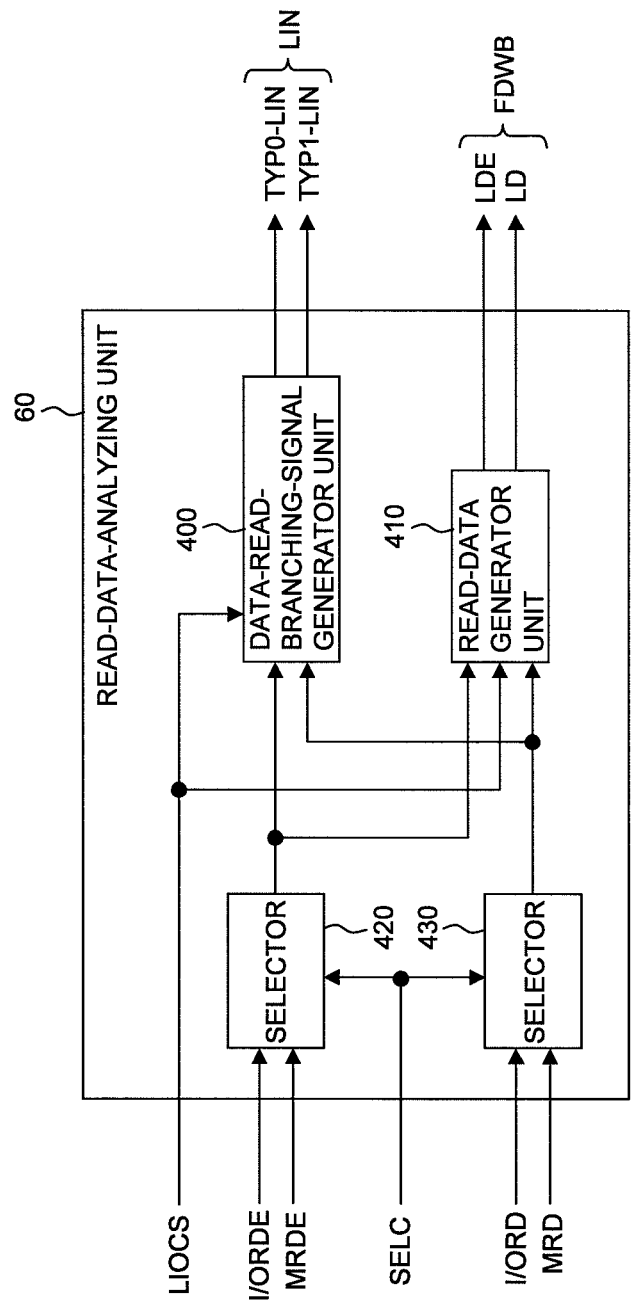
FIG. 13 is a block diagram showing an example of the configuration of the read-data-analyzing unit included in the microprocessor shown in FIG. 12.

FIG. 13 shows an example of the configuration of the read-data-analyzing unit 60 shown in FIG. 12.

As shown in FIG. 13, a selector 420 is provided in a stage precedent to the data-read-branching-signal generator unit 400, and a selector 430 is provided in a stage precedent to the read-data generator unit 410. The selector 420 selectively transmits an I/O device-read-data enable signal I/ORDE, and a memory-read-data-enable signal MRDE to a data-read-branching-signal generator circuit 400 and a read-data generator unit 410, which are located in subsequent stages. The selector 430 selectively transmits I/O device-read data I/ORD, and memory read data MRD to the data-read-branching-signal generator unit 400 and the read-data generator unit 410. The selectors 420 and 430 are controlled, in action, by a selector-control signal SELC, which is output by the load-store unit 40. If the data memory 110 is targeted for access, the selector 420 selects the memory-read-data-enable signal MRDE, and the selector 430 selects the memory read data MRD. Further, if the I/O device 120 is targeted for access, the selector 420 selects the I/O device-read-data enable signal I/ORDE, and the selector 430 selects the I/O device-read data I/ORD. The other actions of the read-data-analyzing unit 60 are the same as those of the read-data-analyzing unit 60 of the microprocessor according to the first embodiment.

Also, the microprocessor 1 shown in FIG. 12 may be arranged so that two or more data formats are set and selectively used according to an application, as in the microprocessor according to the second embodiment (see FIGS. 8 to 11 and 14). In this case, the instruction set includes a first I/O read instruction and a second I/O read instruction. The first I/O read instruction is assigned the data format having a data-read-branching-occurrence bit region as shown in FIG. 8, and the second I/O read instruction is assigned the data format as shown in FIG. 14.

While the invention made by the inventor has been concretely described above based on the embodiments thereof, the invention is not limited to the embodiments. It is obvious that various changes and modifications may be made without departing from the subject matter thereof.

For example, while the microprocessors 1 associated with the invention including the load-store unit 40 and the arithmetic logic unit 50 have been described with reference to FIGS. 1 and 12, various types of execution units for executing various instructions which the microprocessors 1 support may be further provided.

The embodiments have been described on the assumption that types of data read branching are two types, i.e. type #0 and type #1, the invention is not so limited. For instance, a data processor which can handle three or more types of data read branching can be arranged by expanding the data-read-branching-occurrence bit region (200, 210) of the memory read data format, and the data-read-branching ON/OFF control register (300, 310) and data-read-branching address register (320, 330) of the data-read-branching control register 70. In other words, if the data-read-branching-occurrence bit region (200, 210) consists of three or larger bits, the data-read-branching ON/OFF control register (300, 310) of three or more bits is prepared, and the data-read-branching address register (320, 330) provided in the processor is made three or more times in number.

What is claimed is:
1. A data processor comprising:
   a CPU (Central Processing Unit) for executing an instruction included in an instruction set,
   wherein the instruction set includes a load instruction for reading data from a device disposed in a memory space,
      wherein the memory space is managed by the CPU,
   data read according to the load instruction has a format
      wherein the format consists of a data-read-branching-occurrence bit region and a payload data region, the data-read-branching-occurrence bit region being for storing a data-read-branching-occurrence bit, and
the CPU includes
a data-read-branching control register for indicating whether the data-read-branching-occurrence bit is valid or invalid,
at least one data-read-branching address register for holding a data read branching address,
a read-data-analyzing circuit having an input coupled to receive data of the data-read-branching-occurrence bit region, the read-data-analyzing circuit being configured to analyze a bit value set on the data-read-branching-occurrence bit region and a value set on the data-read-branching control register, and having an output to which a result of the analysis is supplied, the analysis not considering data of the payload data region, and
an instruction fetch unit having an input coupled to the output of the read-data-analyzing circuit, and being configured to set an address value on a program counter and to fetch an instruction based on an output value of the program counter, wherein an address value stored in the at least one data-read-branching address register is set on the program counter when the result of the analysis output by the read-data-analyzing circuit indicates that the value set on the data-read-branching control register shows that the data-read-branching-occurrence bit is valid and the bit value set on the data-read-branching-occurrence bit region shows occurrence of data read branching.

2. The data processor according to claim 1, wherein the device disposed in the memory space includes a data memory.

3. The data processor according to claim 2, wherein the device disposed in the memory space further includes an I/O device disposed in the memory space by a memory mapped I/O method.

4. The data processor according to claim 2, wherein the instruction set includes first and second load instructions,
data read according to the first load instruction includes data of a format type having a data-read-branching-occurrence bit region, and
data read according to the second load instruction includes data of a format type such that all of bits of the data read according to the second load instruction are made a payload data region.

5. The data processor according to claim 1, wherein the data-read-branching-occurrence bit region consists of N bits,
the data-read-branching control register consists of N bits, and
the at least one data-read-branching address register includes N data-read-branching address registers,
provided that N is an integer of two or more.

6. A data processor comprising:
a CPU for executing an instruction included in an instruction set; and
an I/O device disposed in an I/O space, wherein the I/O space is managed by the CPU,
wherein the instruction set includes an I/O read instruction for reading data from the I/O device,
data read according to the I/O read instruction has a format wherein the format consists of a data-read-branching-occurrence bit region and a payload data region, the data-reading-branching-occurrence bit region being for storing a data-reading-branching-occurrence bit, and
the CPU includes
a data-read-branching control register for indicating whether the data-read-branching-occurrence bit is valid or invalid,
at least one data-read-branching address register for holding a data read branching address,
a read-data-analyzing circuit having an input coupled to receive data of the data-read-branching-occurrence bit region, the read-data-analyzing circuit being configured to analyze a bit value set on the data-read-branching-occurrence bit region and a value set on the data-read-branching control register, and having an output to which a result of the analysis is supplied, the analysis not considering data of the payload data region, and
an instruction fetch unit having an input coupled to the output of the read-data-analyzing circuit, and being configured to set an address value on a program counter and to fetch an instruction based on an output value of the program counter, wherein an address value stored in the at least one data-read-branching address register is set on the program counter when the result of the analysis output by the read-data-analyzing circuit indicates that the value set on the data-read-branching control register shows that the data-read-branching-occurrence bit is valid and the bit value set on the data-read-branching-occurrence bit region shows occurrence of data read branching.

7. The data processor according to claim 6, wherein the data-read-branching-occurrence bit region consists of N bits,
the data-read-branching control register consists of N bits, and
the at least one data-read-branching address register includes N data-read-branching address registers,
provided that N is an integer more than one.

8. The data processor according to claim 7, wherein the instruction set includes first and second I/O read instructions,
data read according to the first I/O read instruction includes data of a format type having a data-read-branching-occurrence bit region, and
data read according to the second I/O read instruction includes data of a format type such that all of bits of the data read according to the second load instruction are made a payload data region.

9. A data processor comprising:
a CPU for executing an instruction included in an instruction set;
a data memory disposed in a memory space, wherein the memory space is managed by the CPU, and
an I/O device disposed in an I/O space, wherein the I/O space is managed by the CPU,
wherein the instruction set includes a first instruction for reading data from the data memory, and a second instruction for reading data from the I/O device,
data read according to one of the first and second instructions has a format wherein the format consists of a data-read-branching-occurrence bit region and a payload data region, the data-read-branching-occurrence bit region being for storing a data-read-branching-occurrence bit, and
the CPU includes
a data-read-branching control register for indicating whether the data-read-branching-occurrence bit is valid or invalid, at least one data-read-branching address register for holding a data read branching address, a read-data-analyzing circuit having an input coupled to receive data of the data-read-branching-occurrence bit region, the read-data-analyzing circuit being configured to analyze a bit value set on the data-read-branching-occurrence bit region and a value set on the data-read-branching control register, and having an output to which a result of the analysis is applied, the analysis not considering data of the payload data region, and an instruction fetch unit having an input coupled to the output of the read-data-analyzing circuit, and being configured to set an address value on a program counter and to fetch an instruction based on an output value of the program counter, wherein an address value stored in the at least one data-read-branching address register is set on the program counter when the result of the analysis output by the read-data-analyzing circuit indicates that the value set on the data-read-branching control register shows that the data-read-branching-occurrence bit is valid and the bit value set on the data-read-branching-occurrence bit region shows occurrence of data read branching.

* * * * *